US009488954B2

(12) United States Patent
Shimazu

(10) Patent No.: US 9,488,954 B2
(45) Date of Patent: Nov. 8, 2016

(54) IMAGE FORMING APPARATUS

(71) Applicant: KYOCERA Document Solutions Inc., Osaka-shi, Osaka (JP)

(72) Inventor: Kozo Shimazu, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/733,977

(22) Filed: Jun. 9, 2015

(65) Prior Publication Data

US 2015/0363680 A1 Dec. 17, 2015

(30) Foreign Application Priority Data

Jun. 13, 2014 (JP) ................................ 2014-122149

(51) Int. Cl.
*G06K 15/00* (2006.01)
*G03G 21/02* (2006.01)
*G03G 15/00* (2006.01)

(52) U.S. Cl.
CPC ............. *G03G 21/02* (2013.01); *G03G 15/55* (2013.01)

(58) Field of Classification Search
None
See application file for complete search history.

(56) References Cited

U.S. PATENT DOCUMENTS 5,276,533 A * 1/1994 Shimizu ............. H04N 1/00681 358/401
2006/0139687 A1* 6/2006 Ohara ................. G06Q 20/123 358/1.15
2010/0312721 A1* 12/2010 Terada .............. G06Q 30/0283 705/400

FOREIGN PATENT DOCUMENTS

JP 200786423 A 4/2007

* cited by examiner

*Primary Examiner* — Huo Long Chen

(57) ABSTRACT

This image forming apparatus includes an image forming unit, a charging unit, an error detection unit, a determination unit, and a charge-condition changing unit. The image forming unit creates printouts. The charging unit charges for printouts created by the image forming unit. The error detection unit detects errors that occur during the creation of printouts by the image forming unit. The determination unit determines whether or not the error that occurred in the image forming unit is an error made intentionally by the user based on the detection results from the error detection unit. The charge-condition changing unit changes the charge conditions under which the charging unit makes a charge when the determination unit determines that the error is an error made intentionally by a user.

3 Claims, 4 Drawing Sheets

IMAGE FORMING APPARATUS

INCORPORATION BY REFERENCE

The disclosure of Japanese Patent Application No. 2014-122149 filed on Jun. 13, 2014 including the specification, drawings and abstract is incorporated herein by reference in its entirety.

BACKGROUND

This disclosure relates to an image forming apparatus having a charging function.

In recent years, image forming apparatuses, such as printers, copiers, and multifunctional peripherals, are widely available and also installed at establishments that are accessible to an unspecified large number of people, such as convenience stores and public facilities in addition to offices. These image forming apparatuses available for use by people make charges users and collect fees for use.

For example, a charge for image formation including copying is made every time an image is formed on a sheet of paper at a unit price predetermined in accordance with paper sizes and color modes set by selecting monochrome, full color or the like. Even an image forming apparatus installed in an office, that is, in an environment accessible to only specified users, is programmed to measure the usage for each individual or each department, for example. The usage is utilized for cost allocation or the like, and therefore can be regarded as a kind of charge.

When an error, such as a paper jam, occurs during image formation, image forming apparatuses suspend the image forming operation, and then require the user to remove the jammed paper. In this case, charging the user for an incomplete printout caused by the error is a problem. To solve the problem, some image forming apparatuses are programmed not to charge for the possible incomplete printout.

However, adopting a mechanism for uniformly stopping charging for such possible incomplete printouts can possibly provide users with opportunities to acquire printouts at no charge. For example, if a malicious user intentionally induces an error by opening a cover of an image forming unit or other devious ways, the user can obtain sheets on which images have been completely formed in the image forming apparatus as of the point in time, at no charge.

As a measure to prevent this, some known image forming apparatuses determine whether or not to execute charge processing based on presence or absence of a sheet that has already passed a fuser and has become a subject to be charged at the occurrence of an error.

SUMMARY

In an aspect of the present disclosure, an image forming apparatus includes an image forming unit, a charging unit, an error detection unit, a determination unit, and a charge-condition changing unit. The image forming unit creates a printout. The charging unit charges for the printout created by the image forming unit. The error detection unit detects an error that occurs during the creation of the printout by the image forming unit. The determination unit determines whether or not the error that occurred in the image forming unit is an error made intentionally by a user based on a detection result of the error detection unit. If the determination unit determines that the error is an error made intentionally by the user, the charge-condition changing unit changes charge conditions under which the charging unit makes a charge.

DETAILED DESCRIPTION

With reference to the drawings, an embodiment of the present disclosure will be described in detail below. In the following description, a digital multifunctional peripheral embodies the disclosure.

Figure 1:
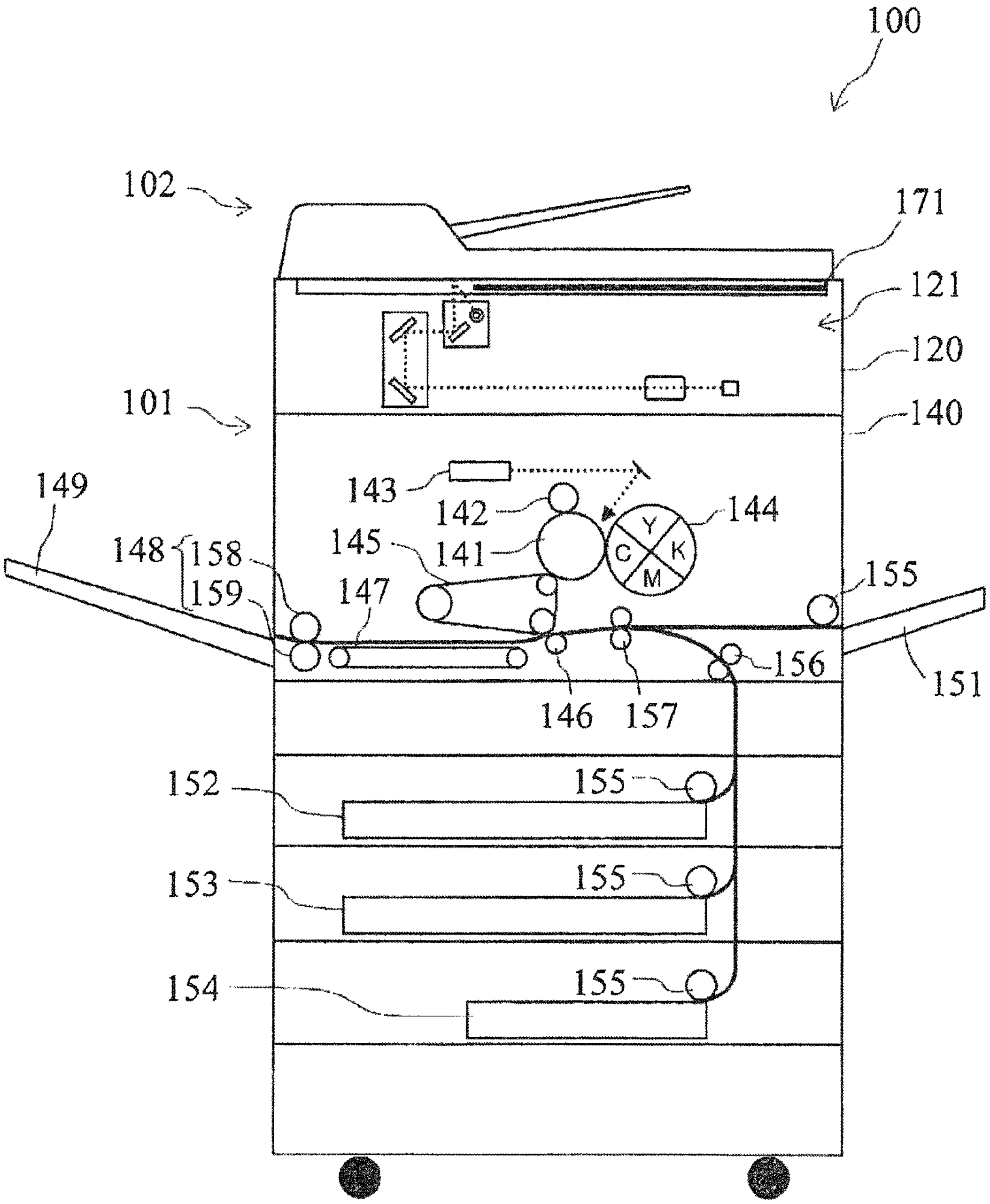
FIG. 1 is a schematic diagram showing the entire configuration of a multifunctional peripheral according to an embodiment of the present disclosure.

FIG. 1 is a schematic diagram showing an example of the entire configuration of the multifunctional peripheral according to the embodiment. As shown in FIG. 1, the multifunctional peripheral 100 includes a main body 101 enclosing an image reading unit 120 and an image forming unit 140, and a platen cover 102 attached on the top of the main body 101. On the front side of the multifunctional peripheral 100 provided is an operation panel 171 that allows users to give the multifunctional peripheral 100 an instruction for starting copying and other instructions, and also allows users to confirm the state and settings of the multifunctional peripheral 100.

The image reading unit 120 is provided in an upper part of the main body 101. The image reading unit 120 reads images of original documents using an optical scanning system 121 and generates digital data (image data) of the images.

The image forming unit 140 prints on paper the image data generated by the image reading unit 120 and image data received from other apparatuses via a network (not shown). The image forming unit 140 includes a photoconductive drum 141 that rotates in one direction at a constant speed. The photoconductive drum 141 is surrounded by a charging device 142, an exposure device 143, a developing device 144, and an intermediate transfer belt 145 disposed in this order from the upstream side along the rotating direction. The charging device 142 uniformly charges the surface of the photoconductive drum 141. The exposure device 143 emits a light beam onto the uniformly charged surface of the photoconductive drum 141 in accordance with the image data to form an electrostatic latent image on the photoconductive drum 141. The developing device 144 applies toner to the electrostatic latent image to form a toner image on the photoconductive drum 141. The intermediate transfer belt 145 transfers the toner image on the photoconductive drum 141 to a sheet of paper. In a case where the image data is a color image, the intermediate transfer belt 145 transfers toner images of respective colors onto a single sheet of paper. Incidentally, a color image of the RGB color model is converted into image data of the C (cyan), M (magenta), Y (yellow), K (black) color model, and image data of each color is input to the exposure device 143.

The image forming unit 140 feeds paper sheets from a manual feed tray 151 or paper cassettes 152, 153, 154 to a transfer unit between the intermediate transfer belt 145 and a transfer roller 146. The manual feed tray 151 and paper cassettes 152, 153, 154 can hold or accommodate various sizes of paper. The image forming unit 140 selects a sheet designated by a user or a sheet corresponding to the automatically detected size of an original document, and feeds the selected sheet using a paper feed roller 155 from the manual feed tray 151 or cassettes 152, 153, 154. The fed paper is sent to the transfer unit by a transport roller 156 and a resist roller 157. The paper on which a toner image is transferred is sent to a fusing device 148 by a transport belt 147. The fusing device 148 includes a fusing roller 158 with an internal heater and a pressurizing roller 159 to fix the toner image on the sheet by heat and pressing force. The image forming unit 140 ejects the sheet, which has passed through the fusing device 148, to a paper output tray 149.

Figure 2:
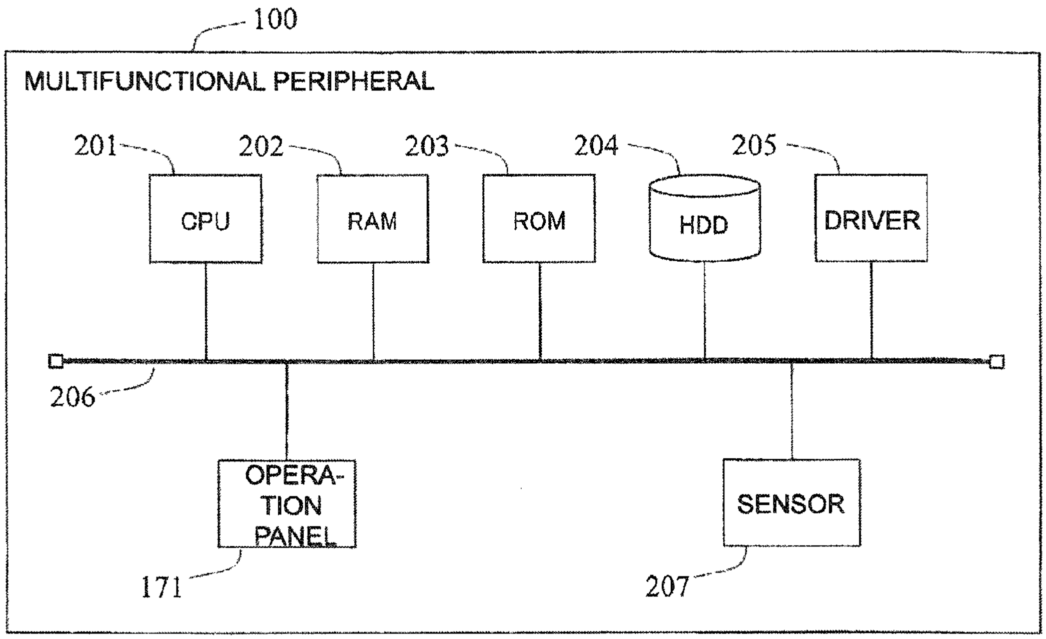
FIG. 2 is a diagram showing the hardware configuration of the multifunctional peripheral according to the embodiment of the disclosure.

FIG. 2 is a diagram showing the hardware configuration of a control system in the multifunctional peripheral. The multifunctional peripheral 100 of the present embodiment includes a central processing unit (CPU) 201, a random access memory (RAM) 202, a read only memory (ROM) 203, a hard disk drive (HDD) 204, and a driver 205 associated with driving sections of the image reading unit 120 and image forming unit 140. These components are connected through an internal bus 206. The ROM 203, HDD 204 and other storage devices store programs, and the CPU 201 controls the multifunctional peripheral 100 according to instructions of control programs. For example, the CPU 201 uses the RAM 202 as a work area and controls operation of the respective driving sections by exchanging data and instructions with the driver 205. The HDD 204 is also used to accumulate image data acquired by the image reading unit 120 and image data received through a network from other apparatuses.

The operation panel 171 and various sensors 207 are also connected to the internal bus 206. The operation panel 171 receives an operational instruction from a user and supplies a signal corresponding to the operation to the CPU 201. The operation panel 171 displays an operation screen on its own display in response to a control signal from the CPU 201. The sensors 207 include a sensor for detecting whether the platen cover 102 is open or closed, a sensor for detecting the presence of an original document on a document table, a temperature sensor for the fusing device 148, a sensor for detecting transported sheets or original documents, and so on.

The CPU 201 executes programs stored in, for example, the ROM 203 to implement the following units (functional blocks) as well as to control the operation of the units according to signals from the sensors.

Figure 3:
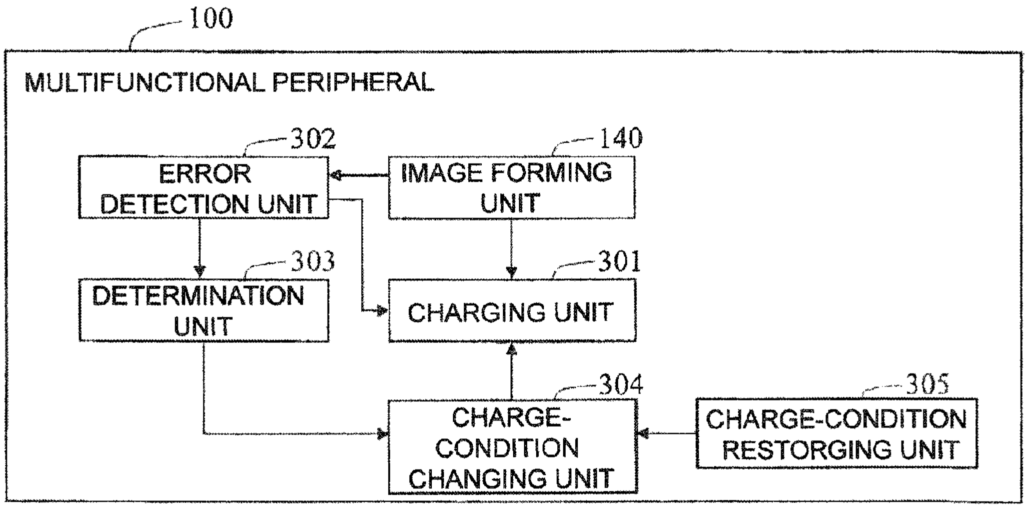
FIG. 3 is a functional block diagram of the multifunctional peripheral according to the embodiment of the disclosure.

FIG. 3 is a functional block diagram of the multifunctional peripheral according to the embodiment. As shown in FIG. 3, the multifunctional peripheral 100 includes a charging unit 301, an error detection unit 302, a determination unit 303, a charge-condition changing unit 304 and a charge-condition restoring unit 305.

The charging unit 301 charges for printouts created by the image forming unit 140. In this embodiment, the charging unit 301 acquires the details of image forming processing performed by the image forming unit 140 and makes a charge for the image forming processing in accordance with charge conditions registered in advance. The charge conditions contain various types of information used to implement a charge corresponding to the details of the image forming processing when the multifunctional peripheral 100 executes image formation. For example, the charge conditions contain a unit price for every combination of paper size, color modes (monochrome, mono color, full color, etc.), print side (simplex printing, duplex printing, etc.), and paper type (plain paper, glossy paper, etc). In addition, the charge conditions contain the timing at which a charge is made. The timing of charge is information indicating when a charge is made at what position in the image forming unit 140 a sheet in the process of image formation arrives. In this embodiment, registered timing of charge is the point in time when a rear end of the sheet passes through the fusing device 148. The passage of the rear end of the sheet through the fusing device 148 can be detected by any well-known methods. For example, a sensor, which is capable of detecting the presence of sheets and disposed on a paper transport path on the downstream side of the fusing device 148, can be used for detection. Alternatively, the passage can be detected by measuring a lapse of time since the resist roller 157 started transporting the sheet.

The error detection unit 302 detects errors that occur during the creation of printouts by the image forming unit 140. Errors during the creation of printouts denote various types of errors that cause interruption of image formation processing, such as a paper jam and running out of paper, but do not include errors not requiring interruption of image formation processing. The error detection unit 302 detects errors that occur during execution of a print job based on outputs from the respective sensors disposed at various locations in the image forming unit 140.

The determination unit 303 determines whether or not the error that occurred in the image forming unit 140 is an error made intentionally by the user based on the detection results from the error detection unit 302. Intentional errors include errors caused by unnecessary operation during image formation processing (hereinafter, referred to as abnormal operation), for example, operation that activates an interlock, power shutdown, and so on. Operation that activates an interlock includes, for example, opening of a cover of the main body 101 and opening of a cover of the document feeder of the platen cover 102 while the image forming apparatus is performing image formation processing, but does not have a paper jam.

The errors caused by abnormal operation may occur even if the user has no intention because, for example, the user may have no knowledge about print operation or may be careless. To preclude such unintentional errors from being determined as intentional errors, the occurrence of a plurality of (e.g., two) errors made by one and the same user with abnormal operation can be defined as a condition for admitting it as an intentional error. Determining if the user is one and the same user can be made based on any condition under which the user can be identified (predicted) as one and the same user, for example, the errors occurred during a series of charge processes, within a prescribed period of time, within a prescribed number of prints, and so on. Also, in order to preclude unintentional errors, the occurrence of an error that is induced by abnormal operation within a prescribed elapsed time since the user instructed the multifunctional peripheral 100 to start copying can be defined as a condition for admitting it as an intentional error. The condition based on the elapsed time can be used together with the condition based on the number of occurrences of the errors.

Incidentally, the series of charge processes can be defined as, for example, when a coin-operated machine or a card reader is connected to the charging unit 301, a period of time from insertion to ejection of a coin or a card. Alternatively, in a case where the charging unit 301 is configured to make a charge (increment a counter) using a charge counter assigned for each user in an office or the like, for example, the series of charge processes can be defined as a period of time in which identification information, which is input by a user into the multifunctional peripheral 100 to identify his/her charge counter to be incremented, remains the same. As it is well-known, such identification information is input by inputting a user ID and password through the operation panel 171, or reading a portable recording media, such as an IC card on which the identification information is stored.

When the determination unit 303 determines that the error is an error made intentionally by a user, the charge-condition changing unit 304 changes the charge conditions under which the charging unit 301 makes a charge. Although it is not particularly limited, if the determination unit 303 determines that the error is an error made intentionally by the user in this embodiment, the charge-condition changing unit 304 changes the timing of charge, which is a condition included in the charge conditions of the charging unit 301, to advance sooner than in normal times. In this description, the charge-condition changing unit 304 changes the timing of charge so as to make a charge when a front end of a sheet arrives at the fusing device 148. With this timing, even if a malicious user tries to intentionally make an error when a sheet has passed through the fusing device 148 for the purpose of acquiring a printout at no charge, the charging processes already have been completed. In addition, it is of no worth for the user to acquire a printout by intentionally making an error before the sheet passes through the fusing device 148 because such a printout before being charged has not passed through the fusing device 148 and therefore the image of the printout is not fixed yet. Thus, acquisition of printouts at no charge can be prevented.

Any well-known method can be used to detect the arrival of the front end of the sheet at the fusing device 148. For example, a sensor, which is capable of detecting the presence of sheets and disposed on a paper transport path on the upstream side of the fusing device 148, can be used for detection. Alternatively, the passage can be detected by measuring a lapse of time since the resist roller 157 started transporting the sheet. The timing of charge can be set to any time point during the image formation processing of a single sheet as long as it is sooner than in normal times, and therefore can be set to a time point when a rear end of the sheet passes through the transfer unit, when a front end of the sheet arrives at the transfer unit, when the developing device 144 finishes the formation of a toner image, or when the exposure device 143 finishes the formation of an electrostatic latent image.

If restoration conditions specified in advance are satisfied, the charge-condition restoring unit 305 causes the charge-condition changing unit 304 to restore the changed charge conditions to the previous state. In short, the charge-condition restoring unit 305 cancels the changes made to the charge conditions by the charge-condition changing unit 304. Anything conceivable that a malicious user has abandoned to acquire printouts at no charge can be adopted as the restoration conditions, for example, termination of a series of charging processes, a prescribed lapse of time, output of the prescribed number of printouts, and so on.

Figure 4:
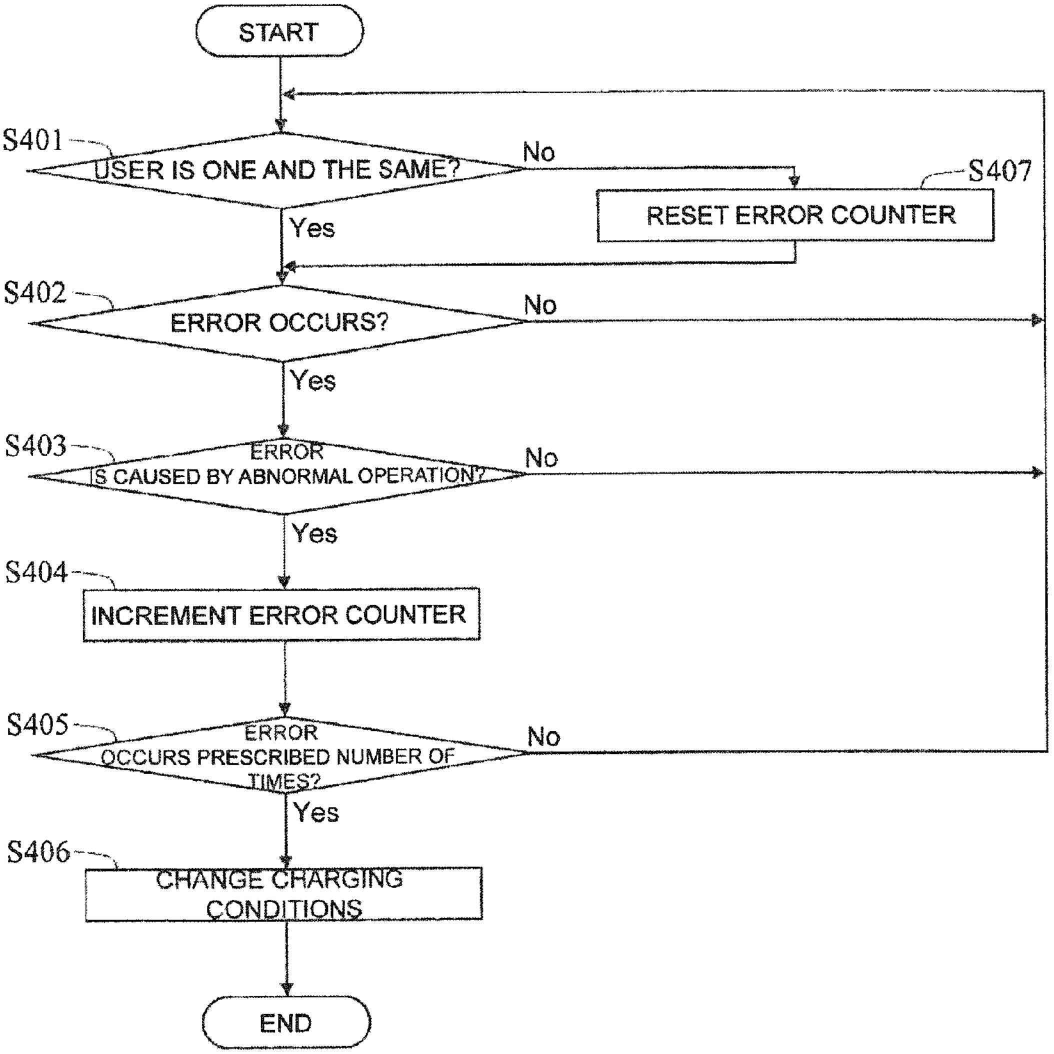
FIG. 4 is a flowchart of an example of a charge-condition changing procedure by which the multifunctional peripheral executes, according to the embodiment of the disclosure.

FIG. 4 is a flowchart showing an example of a charge-condition changing procedure by which the multifunctional peripheral 100 executes. The procedure is triggered by, for example, turning on the main power source of the multifunctional peripheral 100 (startup) or completing the restoration process of charge conditions, which will be described later.

Once the procedure starts, the determination unit 303 constantly monitors the identity of a user. In this description, the identity of the user can be confirmed by the above-described methods (step S401). Under the circumstance where the user is one and the same, the determination unit 303 waits until the error detection unit 302 detects an error in the image forming unit 140 (Yes in step S401, No in S402, S401).

If the error detection unit 302 detects an error that occurred during execution of a print job in the image forming unit 140, the error detection unit 302 inputs information about the details of the error into the determination unit 303 (Yes in step S402). Then, the determination unit 303 determines whether or not the error that occurred is an error caused by the aforementioned abnormal operation (step S403). If the error is not caused by the abnormal operation, the determination unit 303 does nothing special (No in step S403, S401).

On the other hand, if the error is caused by abnormal operation, the determination unit 303 increments its own error counter (Yes in step S403, S404). Then, the determination unit 303 determines whether or not the count has reached a prescribed number of times on which the determination of a user's intentional error is based. For example, in a case where the prescribed number of times is two, if the count of the error counter is "1", the determination unit 303 does not determine that the error is an intentional error and does nothing special (No in step S405, S401). On the other hand, if the count of the error counter is "2", the determination unit 303 determines that the error is an intentional error and notifies the charge-condition changing unit 304 of the determination. The charge-condition changing unit 304 that has received the notification changes the charge conditions (timing of charge in this description) of the charging unit 301 (Yes in step S405, S406).

If the user is changed to another under the circumstances where the determination unit 303 determines that the error is not an intentional error, the determination unit 303 resets the error counter (No in step S401, S407, S402). By resetting the error counter, when the different user makes an error caused by unintentional abnormal operation, the determination unit 303 can avoid determining that the error is an intentional error.

In the above-described embodiment, occurrence of a plurality of errors induced by abnormal operation constitutes a ground for determining that a user made an intentional error. However, the determination unit 303 can determine the occurrence of the intentional error on the basis of a single abnormal operation. In this case, the aforementioned prescribed number of times is set to one.

Figure 5:
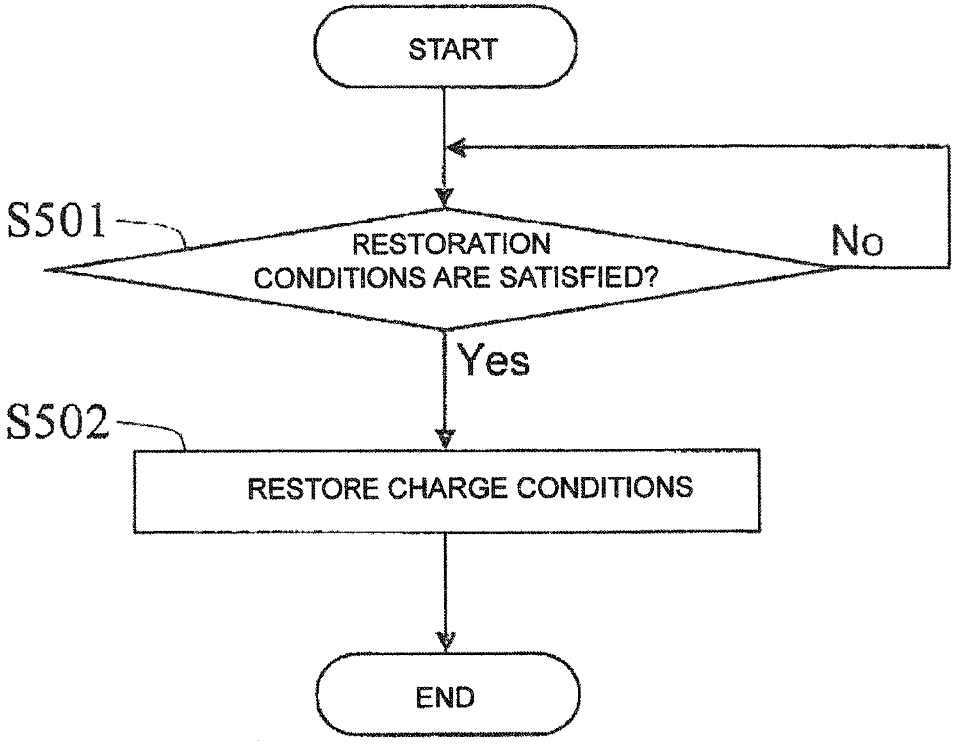
FIG. 5 is a flowchart of an example of a charge-condition restoring procedure by which the multifunctional peripheral executes, according to the embodiment of the disclosure.

The following is a description of a procedure performed by the multifunctional peripheral 100 under a circumstance where the charge-condition changing unit 304 has changed the charge conditions of the charging unit 301. FIG. 5 is a flowchart showing an example of a charge-condition restoring procedure by which the multifunctional peripheral 100 executes. The procedure is triggered by changing the charge conditions of the charging unit 301 by the charge-condition changing unit 304.

Once the procedure starts, the charge-condition restoring unit 305 constantly monitors whether or not the prescribed restoration conditions are satisfied (step S501). While the restoration conditions are not satisfied, the charge-condition restoring unit 305 does nothing special. Therefore, the changes made to the charging conditions of the charging unit 301 by the charge-condition changing unit 304 are continuously effective (No in step S501).

If the restoration conditions are satisfied, on the other hand, the charge-condition restoring unit 305 instructs the charge-condition changing unit 304 to change the charging conditions (Yes in step S501). The charge-condition changing unit 304 that has received the instruction restores the charge conditions of the charging unit 301 to the previous state (step S502). Thus, the charging conditions of the charging unit 301 are restored to charging conditions in normal times.

As described above, when the error that occurred is an error made intentionally by a user, the multifunctional peripheral 100 can change the charging conditions based on how the error has occurred. Therefore, the multifunctional peripheral 100 can select charging conditions enabling a more reliable charge to users who made errors intentionally.

In addition, the multifunctional peripheral 100 provided with the charge-condition restoring unit 305 can automatically cancel the changes made to the charging conditions which are used to prevent malicious users from acquiring printouts at no charge.

By the way, the multifunctional peripheral 100 in the embodiment illustrated above is configured so that the charge-condition changing unit 304 changes the timing of charge when the error is determined as an intentional error made by a user for the purpose of avoiding advance acquisition of fees. However, charges can be made for all sheets being subjected to image formation in the multifunctional peripheral 100 irrespective of whether image formation is properly or improperly complete, which is different from the above-described embodiment in which charges are made upon completion of proper image formation, such as at a point of time when a sheet passes through the fusing device 148. In this case, the multifunctional peripheral 100 is configured so that when the error detection unit 302 detects an error, the charging unit 301 refunds for the sheet associated with the error, thereby implementing the same charges as the above-described embodiment in normal times.

In such a configuration, if the determination unit 303 determines that the error is made intentionally by a user, the charge-condition changing unit 304 changes the charge conditions of the charging unit 301 to disable the refund processing of the charging unit 301, thereby achieving the effects equal to those of the above-described embodiment. In addition, the charge-condition restoring unit 305 can be configured to automatically cancel the changes made to the charge conditions which are used to prevent malicious users from acquiring printouts at no charge.

The above-mentioned embodiment does not limit the technical scope of the present disclosure, and in addition to the examples described above, various modifications and applications can be applied within a range of the present disclosure. For example, the image forming apparatus in the above embodiment is configured so as to include a charge-condition restoring unit 305 as an especially preferred embodiment; however, the charge-condition restoring unit 305 is merely an optional element. Even if the image forming apparatus does not include the constituent component, it can prevent a malicious user from acquiring printouts at no charge. In this case, for example, a person in charge can operate the multifunctional peripheral 100 to cancel the changes made to the charge conditions by the charge-condition changing unit 304.

The flowcharts shown in FIGS. 4 and 5 can be changed in an appropriate manner within a range producing equivalent effects. For example, the determination unit 303 constantly monitors the identity of a user in FIG. 4. However, the determination unit 303 can be configured so as to retain user identification information to use it to determine whether or not the user is one and the same upon the occurrence of abnormal operations. In this case, if an abnormal operation occurs after the retention of the user identification information, the determination unit 303 compares user identification information at this point with the user identification information held therein, thereby determining the identity of the user. The user identification information can be, for example, a charge ID containing the same identification assigned for a series of charges, the time at which an error occurred, the count of printouts at the occurrence of the error, etc.

In addition, the present disclosure is embodied as a digital multifunctional peripheral in the above-described embodiment, but is not limited to the digital multifunctional peripheral, and can be applied to any types of image forming apparatuses, such as a printer, and a copier.

According to the present disclosure, the image forming apparatuses can reliably prevent malicious users from acquiring printouts at no charge and serves useful functions.

What is claimed is:

1. An image forming apparatus comprising:

an image forming unit that creates a printout; and a CPU, the CPU implementing a charging unit that charges for the printout created by the image forming unit; an error detection unit that detects an error that occurs during the creation of the printout by the image forming unit;

a determination unit that determines whether or not an error that occurred in the image forming unit is an error made intentionally by a user based on a detection result of the error detection unit; and a charge-condition changing unit that, when the determination unit determines that the error is an error made intentionally by the user, changes charge conditions under which the charging unit makes a charge, wherein when the determination unit determines that the error is an error made intentionally by the user, the charge-condition changing unit changes the charge conditions so as to advance timing at which the charging unit makes a charge sooner than in normal times, wherein the determination unit determines a plurality of errors made by one and the same user with abnormal operation as an intentional error, wherein the error made intentionally by the user is an error caused by unnecessary operation during image formation processing, where the unnecessary operation is an operation that activates an interlock or power shutdown, wherein the operation that activates an interlock is opening of a cover of the main body and opening of a cover of the document feeder of the platen cover while the image forming apparatus is performing image formation processing, but does not have a paper jam.

2. The image forming apparatus according to claim 1, wherein the charging unit makes a charge for every sheet on which an image is formed and, when the error detection unit detects an error, the charging unit refunds the charge for a sheet associated with the error, and when the determination unit determines that the error is an error made intentionally by the user, the charge-condition changing unit changes the charge conditions so as to disable the refund processing of the charging unit.

3. The image forming apparatus according to claim 1 further comprising a charge-condition restoring unit implemented by the CPU that when prescribed restoring conditions are satisfied, causes the charge-condition changing unit to restore the charge conditions that have been changed to the previous state.

* * * * *